US006333567B1

(12) United States Patent
Shiroyama et al.

(10) Patent No.: US 6,333,567 B1
(45) Date of Patent: Dec. 25, 2001

(54) STARTER

(75) Inventors: Shigeru Shiroyama; Motoi Hisamoto; Akira Kuragaki; Koichiro Kamei; Takehiro Kobayashi; Hidekazu Katayama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,285

(22) Filed: Dec. 22, 1999

(30) Foreign Application Priority Data

May 27, 1999 (JP) ................................................ 11-148164

(51) Int. Cl.[7] ................................ F02N 11/00; H02P 9/04

(52) U.S. Cl. .................. 290/38 A; 290/38 R; 290/38 C; 290/38 D; 310/75 R; 310/78

(58) Field of Search ............................... 290/36 R, 38 A, 290/38 B, 38 C, 38 D, 38 E, 30 P, 30 Q, 30 R; 310/75 R, 12; 74/6, 7 R, 7 C

(56) References Cited

U.S. PATENT DOCUMENTS

| | | | | |
|---|---|---|---|---|
| 4,852,417 | * | 8/1989 | Tanaka | 74/7 E |
| 4,862,027 | * | 8/1989 | Isozumi et al. | 310/99 |
| 4,907,464 | * | 3/1990 | Isozumi | 74/7 A |
| 5,013,950 | * | 5/1991 | Isozumi | 310/83 |
| 5,111,705 | * | 5/1992 | Isozumi | 76/6 |
| 5,118,960 | | 6/1992 | Sasamoto et al. | 290/48 |
| 5,839,318 | * | 11/1998 | Kimura et al. | 74/7 R |

FOREIGN PATENT DOCUMENTS 2865808 12/1998 (JP) .

* cited by examiner

*Primary Examiner*—Elvin Enad
(74) *Attorney, Agent, or Firm*—Sughrue, Mion, PLLC

(57) ABSTRACT

To secure sufficient attractive force against a plunger, an overrunning clutch is arranged so that one end of a thrust spline is positioned so as to maintain a prescribed interval from the end of the plunger in the condition where the plunger is unexcited by an exciting coil and the outside periphery of the output shaft corresponding to the prescribed interval is covered by a cylinder body formed of a non-magnetic material or less permeable material.

12 Claims, 9 Drawing Sheets

STARTER

BACKGROUND OF THE INVENTION

1. Field of the Invention

The present invention relates to a starter for starting an engine.

2. Description of the Prior Art

Starters (coaxial-type starter) have been known which have the structure in which an electromagnetic switch, an overrunning clutch with a pinion engaged with a ring gear and a plunger (moving core) are set coaxially with respect to an output shaft.

This type of starter works as follows.

Specifically, when current flows through an exciting coil of the electromagnetic switch, the plunger is attracted by an exciting core of the electromagnetic switch and a moving contact is brought into contact with a fixed contact a short while after the attraction and shift of the plunger, to supply power to a d.c. motor thereby rotating the output shaft via a shaft (a motor shaft) and reduction mechanism and the like. By this rotation, the overrunning clutch which is spline-joined with the output shaft shifts toward the ring gear whereby the pinion is engaged with the ring gear to start an engine.

The above plunger has a cylinder form, is arranged so as to enclose the outside periphery of the output shaft and shifts the overrunning clutch toward the ring gear.

The overrunning clutch is provided with a thrust spline having a cylinder section with an inside periphery on which a helical spline section which is spline-joined with a helical spline section formed on the output shaft and also constitutes a so-called one-way clutch.

In such a clutch as aforementioned, the output shaft and the thrust spline of the overrunning clutch which is spline-joined with the output shaft are usually made from hardened steel.

However, the use of the output shaft and thrust spline formed from hardened steel causes a lot of magnetic flux to leak from the plunger to the output shaft and from the output shaft to the thrust spline and hence insufficient attractive force (initial attractive force) is obtained at the start when the resting plunger is attracted, specifically, posing the problem of insufficient force for attracting the plunger.

In the above case, it is possible to reduce the leakage of the magnetic flux by designing a large interval between the output shaft and the plunger (an air gap between the inside periphery of the plunger cylinder and the outside periphery of the output shaft). This however poses the problem that the size of the starter in the radial direction is increased with the result that the starter is large in size.

SUMMARY OF THE INVENTION

The present invention has been conducted to solve such a problem as aforementioned and has an object of providing a starter which can be small in size and ensure force sufficient to attract a plunger.

A starter according to the present invention is characterized in that an overrunning clutch is arranged so that one end of a thrust spline is positioned so as to maintain a prescribed interval (g2) from the end of a plunger facing an exciting core in the condition where the plunger is unexcited by an exciting coil and the outside periphery of an output shaft which corresponds to the prescribed interval is covered by a cylinder body formed of a non-magnetic material or a less permeable material. Preferably the prescribed interval is larger than the interval between the end of the exiting core and the end of the plunger. Preferably the diameter of the output shaft is smaller in at least the part corresponding to the prescribed interval than in the part that is spline-joined with the thrust spline.

The above and other objects, features and advantages of the present invention will become more apparent from the following description when taken in conjunction with the accompanying drawings:

DESCRIPTION OF THE PREFERRED EMBODIMENT

First Embodiment

A first embodiment of a starter according to the present invention will be explained with reference to the drawings.

Figure 1:
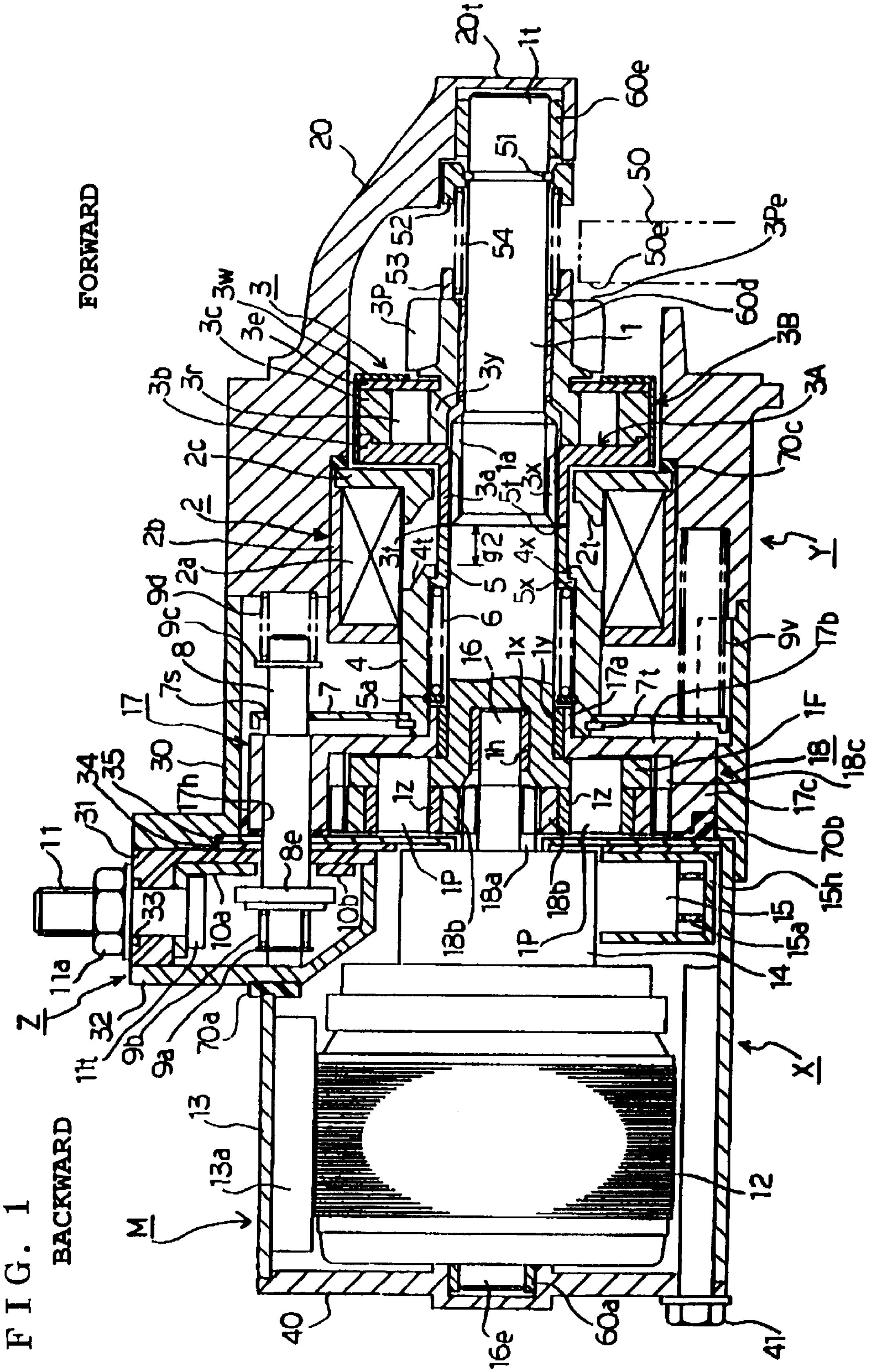
FIG. 1 is a sectional view showing the structure of a starter according to a first embodiment of the present invention.

FIG. 1 is a sectional view showing the structure of the starter according to the first embodiment. In FIG. 1, the left part is a d.c. motor section X, the right part is a working section Y and the upper part in almost the center of the figure is a contact chamber Z. The motor side and the ring gear side are, as required, called "rear" and "front" respectively in the following explanations.

The starter according to the first embodiment is covered by a front bracket 20, a center bracket 30 and a rear bracket 40 which are external wall materials, and exhibits a shell-like appearance. Incidentally, a part into which a ring gear 50 is inserted forms an opening portion.

Inside of the starter, a d.c. motor M and an output shaft 1 driven by the d.c. motor M are disposed and an electromagnetic switch 2, an overrunning clutch 3, a plunger (moving core) 4, which each have a ring form, and the like are arranged around the output shaft 1.

Specifically, the starter according to the first embodiment is a coaxial-type starter in which the electromagnetic switch 2, the overrunning clutch 3 and the plunger 4 are set coaxially with respect to the output shaft 1.

In the first embodiment, in the condition that the plunger is unexcited by the exciting coil of the electromagnetic switch 2, the overrunning clutch 3 is arranged so that one end of a thrust spline is positioned so as to maintain a prescribed interval (g2) from the end of the plunger 4 facing the exciting core, and the outside periphery of the output shaft 1 which corresponds to the prescribed interval g2 is covered by a cylindrical body formed of a non-magnetic material or less permeable material.

The d.c. motor M, as is well-known, consists of an armature 12, a yoke 13 covering the periphery of the armature 12, a fixed magnetic pole 13*a* formed in the inside of the yoke 13, a commutator 14, brushes 15 and a shaft 16. The armature 12 is produced by winding an armature coil around an armature core and the front side of the shaft 16 penetrates the cylinder space of the commutator 14 and is connected to a reduction mechanism 18.

The armature coil is connected to the commutator 14. The d.c. motor M includes bipolar machines, tetra-polar machines and hexa-polar machines corresponding to the number of magnetic poles. Taking a d.c. motor of a hexa-polar machine as an example, six fixed magnetic poles 13*a* in which an N pole and an S pole are arranged alternately are formed in total and the brushes 15 which are in contact with the commutator 14 are disposed alternately along the periphery of the commutator 14.

15*a* represents a spring for pushing the brush 15 against the commutator 14, and 15*h* represents a brush holder.

The d.c. motor Mas aforementioned is used to drive the output shaft 1.

The working section Y comprises the reduction mechanism 18, the output shaft 1, the electromagnetic switch 2, the overrunning clutch 3, and the plunger 4.

17 represents an internal gear member, which comprises a first cylinder section 17*a* fitted on the outside periphery of the output shaft 1 via a bearing 1*y*, a disk-shaped hollow bottom plate section 17*b* extending from the first cylinder section 17*a* in a direction perpendicular to the outside periphery of the output shaft 1, and a second cylinder section 17*c* which extends backwards from the outside peripheral edge of the bottom plate section 17*b* and has an internal gear 18*c* in the inside periphery thereof.

The reduction mechanism 18 is constituted of the internal gear 18*c* of the internal gear member 17, a sun gear 18*a* set on the shaft 16, plural epicyclic gears 18*b* which are arranged around the sun gear 18*a* and engaged with the sun gear 18*a* and the internal gear 18*c*, and a pin 1P which projects from a flange section 1F of the output shaft 1 inserted between the epicyclic gear group 18*b* and the bottom plate section 17*b* of the internal gear member 17 and connects each epicyclic gear 18*b* to the flange section 1F of the output shaft 1. The torque of each epicyclic gear 18*b* is transferred to each of pins 1P via the bearing 1*z*.

Incidentally, a cyclic groove 1*h* is formed in the center of the flange section if of the output shaft 1 and the front end of the shaft 16 is supported in a movable manner through a bearing 1*x* provided in the cyclic groove 1*h*.

Figure 5:
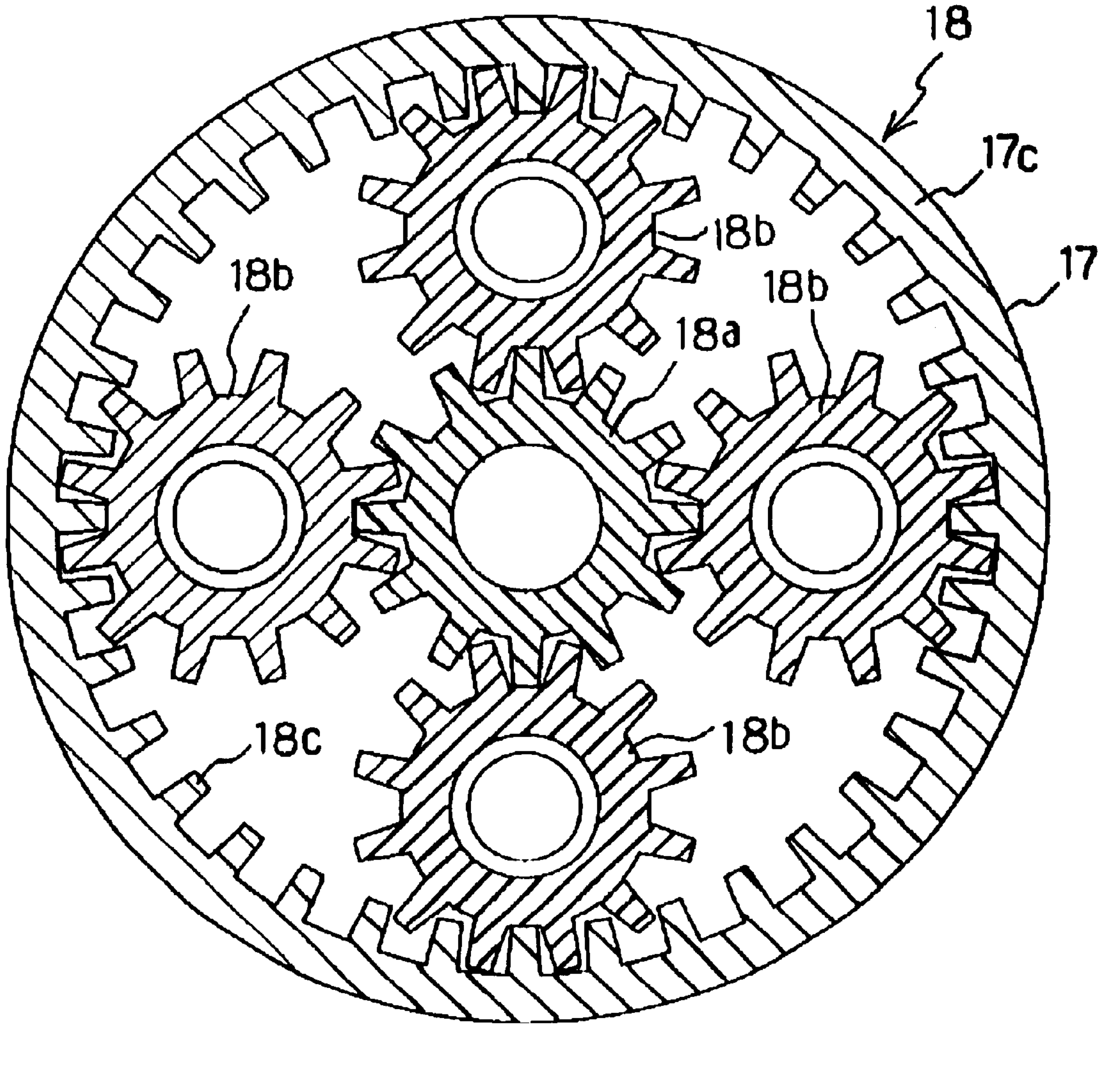
FIG. 5 is a sectional view of a reduction mechanism.

Accordingly, as shown by a sectional view in FIG. 5, each epicyclic gear 18*b* revolves around the sun gear 18*a* whereby the torque of the shaft 16 is decelerated and transferred to the output shaft 1 via the pin 1P.

Moreover, on the outside periphery of a part of the central side of the output shaft 1, a helical spline 1*a* is formed. On the outside periphery of the portion in which the helical spline 1*a* is formed, the overrunning clutch 3 is arranged so that the cylinder section 3*a* of the thrust spline 3A corresponds to the helical spline 1*a*. In the inner surface of the cylinder section 3*a* of the thrust spline 3A, a helical spline 3*x* engaged with the helical spline 1*a* is formed. The overrunning clutch 3 is therefore spline-connected to the output shaft 1.

The electromagnetic switch 2 is disposed on the side of the outside periphery of the cylinder section 3*a* of the thrust spline 3A.

The plunger 4 is disposed on the outside periphery of the side of the flange section 1F in the output shaft 1.

The overrunning clutch 3 comprises the thrust spline 3A consisting of the cylinder section 3*a* with the inner surface formed with the helical spline 3*x* to be engaged with the helical spline 1*a* formed on the outside periphery of part of the central side of the output shaft 1 and the flange section 3*b* which is disposed in the front side of the cylinder section 3*a* and is a cam bottom of a roller cam mentioned later; a roller cam 3*c* which is sandwiched between the flange section 3*b* of the thrust spline 3A and a washer 3*e;* a pinion 3P; a crutch inner 3*y* formed of a cylinder section at the root of the pinion 3P; a clutch roller 3*r* and a spring 3*s* which are both disposed in a groove 3*t* formed in the roller cam 3*c;* and a clutch cover 3*w* covering the exteriors of the flange section 3*b* of the thrust spline 3A, roller cam 3*c* and washer 3*e*.

The thrust spline 3A and the roller cam 3*c* form a clutch outer section 3B.

Figure 6:
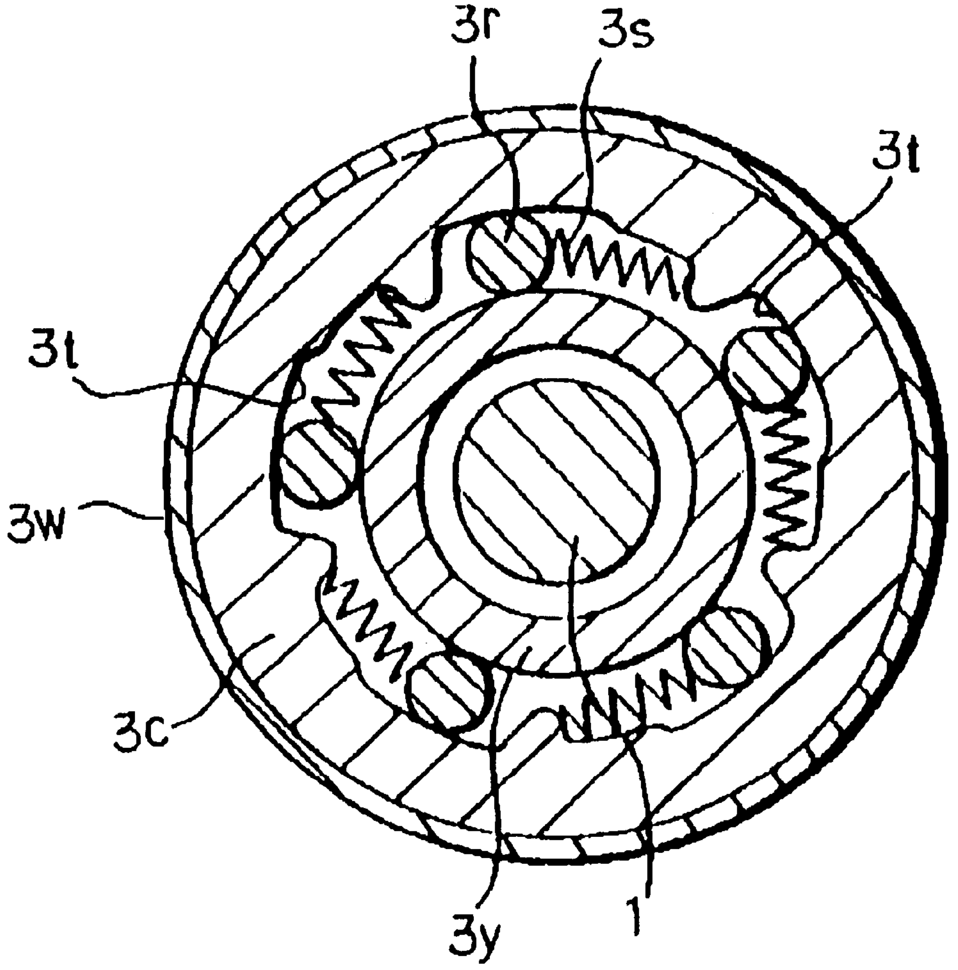
FIG. 6 is a sectional view of an overrunning clutch.

The overrunning clutch 3 works as a so-called one-way clutch. FIG. 6 shows a sectional view of the overrunning clutch 3. Grooves 3*t* which form a narrow space and a wide space between the inner periphery of the roller cam 3*c* and the outside periphery of the clutch inner section 3*y* are formed. In each groove 3*t,* the clutch roller 3*r* is disposed. A spring 3*s* forces the clutch roller 3*r* in the direction of the narrow space of the groove 3*t*.

When the output shaft 1 is driven by the d.c. motor M, the roller cam 3*c* rotates, thence the clutch roller 3*r* moves toward the narrow space of the groove 3*t* and the roller cam 3*c* of the clutch outer section 3B mates with the clutch inner section 3*y* whereby the pinion 3P is rotated to engage with a ring gear 50. Once the pinion 3P has made a revolution with the ring gear 50, the clutch roller 3*r* moves toward the wide space of the groove 3*t* to release the clutch outer section 3B from the clutch inner section 3*y,* thereby detaching the overrunning clutch 3 from the engine.

The electromagnetic switch 2 consists of the exciting coil 2*a,* a switch case 2*b* covering the exciting coil 2*a* and the core 2*c,* and is disposed at a position closer to the rear side than the overrunning clutch 3B. The core 2*c* has a disk-shaped hollow plane facing the flange section 3*b* of the thrust spline 3A, comprises a cyclic body arranged so as to penetrate the outside periphery of the cylinder section 3*a* of the thrust spline 3A and has a cyclic projecting section 2*t* extending to the rear side in the side of the cylinder section 3*a* of the thrust spline 3A.

The plunger 4 is formed of a cylinder body disposed in a manner movable in the direction toward the exciting core 2*c* along the inside periphery of the switch case 2*b*. The end 4*t* facing the cyclic projecting section 2*t* of the core 2*c* is formed into a shape corresponding to that of the cyclic projecting section 2*t*.

The embodiment 1 has the following structure to reduce the magnetic flux which leaks from the plunger 4 to the output shaft 1. Specifically, in the condition where the plunger 4 is unexcited by the exciting coil 2*a,* the overrunning clutch 3 is arranged so that one end 3*f* (of the cylinder section 3*a*) of the thrust spline 3A is positioned so as to keep a prescribed interval (g2) from the end 4*t* of the plunger 4 facing the exciting core 2*c*.

The outside periphery of the output shaft 1 which corresponds to the prescribed interval g2 is covered by a cylindrical body 5 formed of a non-magnetic material or less permeable material.

The end 4*t* of the plunger 4 is formed with a first holding section 4*x* projecting toward the output shaft 1 and the other end of the cylinder body 5 is formed with a second holding section 5*x* which mates with the first holding section 4*x*.

Therefore, the cylinder body 5 is arranged so that one end 5*f* thereof is in contact with one end 3*f* of the thrust spline 3A and the other end is mated with the first holding section 4*x* through the second holding section 5*x*.

A cyclic plate 5*a* is secured to the inside periphery of the rear end side of the plunger 4. Also, a coil spring 6 as an elastic means is disposed between the inside periphery of the plunger 4 and the outside periphery of the output shaft 1 and between the plate 5*a* and the second holding section 5*x* of the cylinder body 5. The plate 5*a* functions as a pressure plate which transfers the elastic force, accumulated in the coil spring 6, to the overrunning clutch 3 via the cylinder body 5 to engage the pinion 3P with the ring gear 50.

The cylinder body 5 resultantly functions to transfer the elastic force, accumulated in the coil spring 6, to the overrunning clutch 3.

Accordingly, the plunger 4 is attracted by the core 2*c* and moves toward (forward) the core 2*c* and the overrunning clutch 3 is pushed by the cylinder body 5, which transfers the pressing force of the plate 5*a* and coil spring 6, along with the shift of the plunger 4 and moves, whereby the end face 3P*e* of the pinion 3P is brought into contact with the end face 50*e* of the ring gear 50. After the movement of the overrunning clutch 3 is thereby stopped once, the motor is driven. When each crest and bottom of the teeth of the pinion 3P and ring gear 50 are intermeshed, the pinion 3P is meshed with the ring gear 50 by the elastic force accumulated in the coil spring 6 which has been depressed until that time.

8 represents a contact shaft, which is supported so as to be movable in the direction along the shaft by a support hole 17*h* formed in a part (the upper side of FIG. 1) of the second cylinder section 17*c* of the internal gear member 17. The contact shaft 8 is provided so that it extends into the working section Y and the contact chamber Z through the support hole 17*h*.

A moving contact 8*e* is provided on the side of one end of the contact shaft 8 which end is positioned in the contact chamber Z. In addition, a cyclic plate 9*a* is secured to the contact shaft 8 on the rear side of the moving contact 8*e* and a coil spring 9*b* for pushing the moving contact 8*a* against the side of a fixed contact (explained later) is provided between the plate 9*a* and the moving contact 8*e*. Moreover, a cyclic plate 9*c* is secured to the contact shaft 8 on the other end of the shaft which end is positioned in the side of the working section Y and a push-back coil spring 9*d* is provided between the plate 9*c* and a front bracket 20.

A shift plate 7 is attached to the rear end side of the plunger 4. The shift plate 7 is formed of a long, narrow plate material extending vertically. In the central side of the shift plate 7, a hole used to install the shift plate 7 on the rear end side of the plunger 4 is formed and a through-hole 7*s* is formed in the upper side corresponding to the contact shaft 8. The shift plate 7 is secured to the plunger 4 by a holding ring 7*t*. Further, a push-back coil spring 9*v* is provided between the lower part of the shift plate 7 and the front bracket 20.

The shift plate 7 secured to the plunger 4 and the plate 9*c* as a plate contact part constitute a contact shaft moving means.

Also, the plate 5*a,* the coil spring 6 and the cylinder body 5 constitute a forcing means.

The motor section X, the contact chamber Z, and the working section Y are partitioned through dividing plates 34, 35.

The contact chamber Z is partitioned by a contact chamber wall 31 and a contact chamber cover 32. In the contact chamber wall 31, a first fixed contact 10*a* and a second fixed contact 10*b* are provided.

The first fixed contact 10*a* is connected to a battery via a terminal bolt 11. The second fixed contact 10*b* is connected to a plus pole brush via a lead line and also to the other end of the exciting coil 2*a* of the electromagnetic switch 2.

The terminal bolt 11 is secured by a nut 11*a* whereby the first fixed contact 10*a* is secured to the contact chamber wall 31 at a head section 11*t*.

33 represents an O ring and 70*b* and 70*c* represent packings.

The rear end 16*e* of the shaft 16 is supported in a rotation free manner by a rear bracket 40 via a bearing 60*a,* and the front end 1*t* of the output shaft 1 is supported by the side of the end 20*t* of the front bracket 20 via a bearing 60*e.*

A stopper 52 is provided on the front side of the output shaft 1 through a holding ring 51, and a stopper 53 is provided at the end of the pinion 3P. A push-back coil spring 54 is provided between these stoppers 52, 53.

41 represents a bolt securing the d.c. motor section X and the working section Y after these sections are placed between the rear bracket 40 and the front bracket 20.

Figure 7:
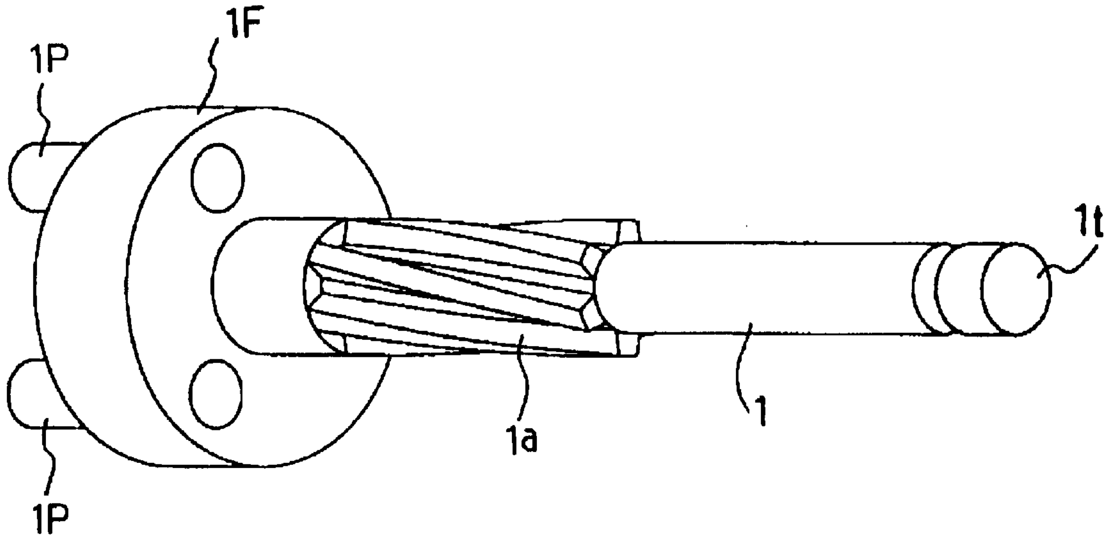
FIG. 7 is a perspective view of an output shaft.
Figure 8:
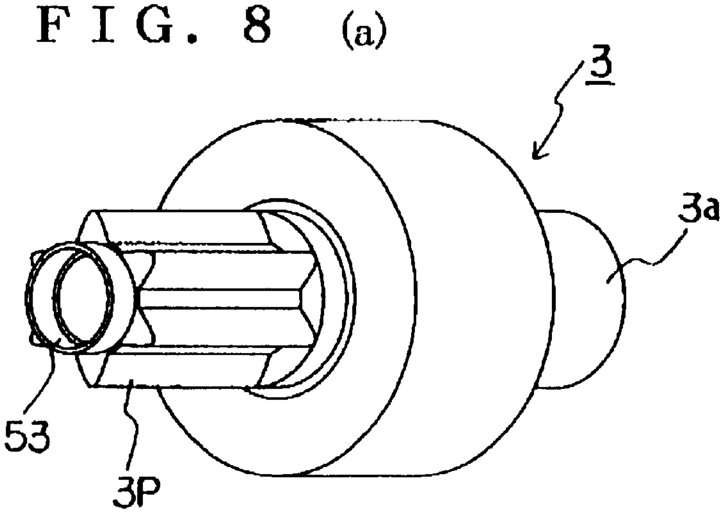
FIG. 8(*a*) and FIG. 8(*b*) are perspective view of the overrunning clutch.
Figure 8:
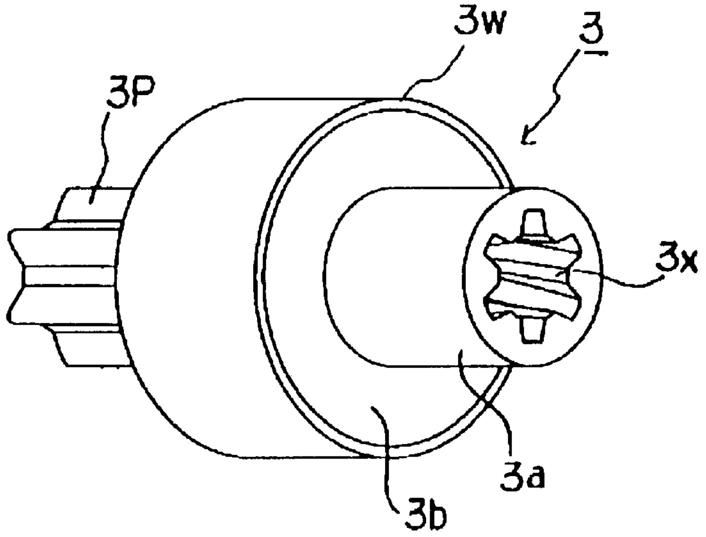
Figure 9:
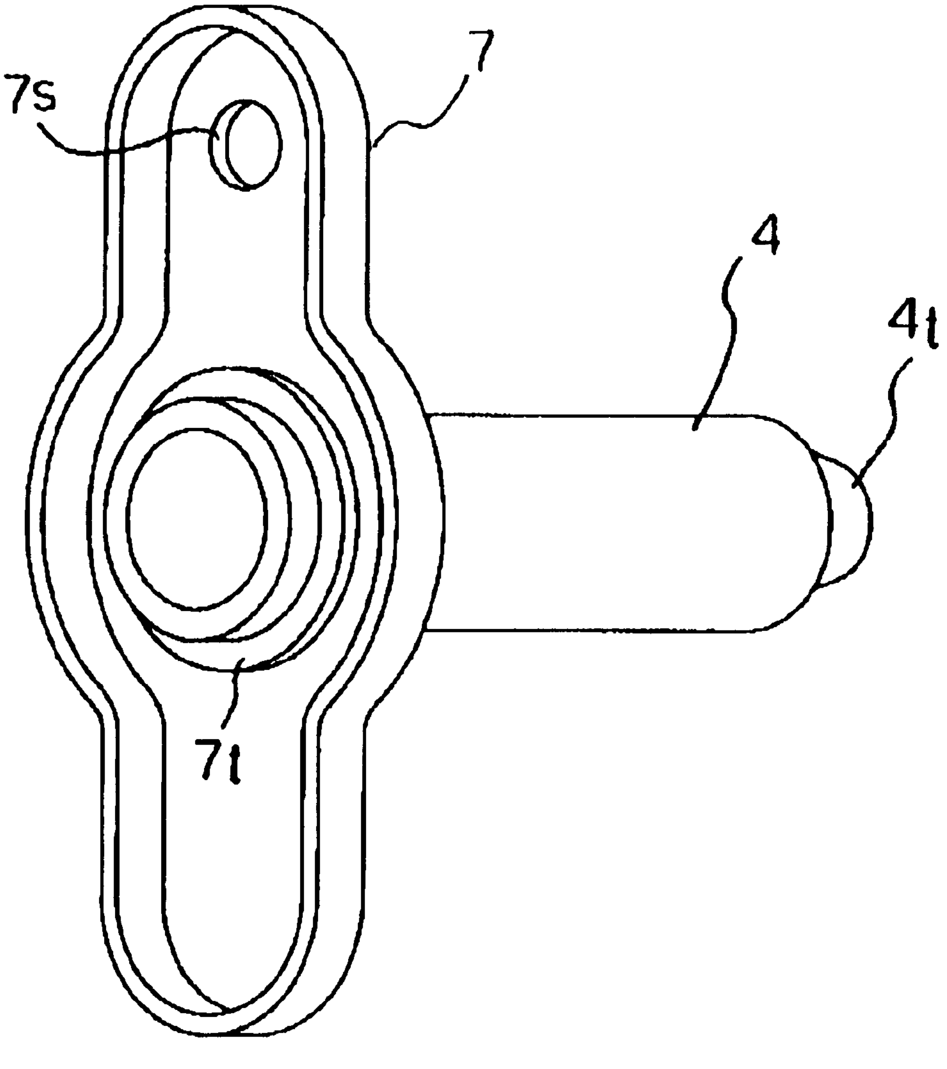
FIG. 9 is a perspective view showing a plunger and a shift plate.

FIG. 7 shows a perspective view of the output shaft 1, FIGS. 8(*a*) and 8(*b*) show perspective views of the overrunning clutch 3, and FIG. 9 shows a perspective view of the plunger 4 and the shift plate 7.

A discussion of the action of the starter follows.

When an ignition switch is turned on to cause current to flow through the exciting coil 2*a* of the electromagnetic switch 2, the plunger 4 is attracted toward to the exciting core 2*c,* then the plate 5*a* presses against the coil spring 6. Along with this action, the cylinder body 5 pressed the thrust spline 3A to push the overrunning clutch 3 toward the ring gear 50. The end face 3P*e* of the pinion 3P provided on the overrunning clutch 3 is thereby brought into contact with the end face 50*e* of the ring gear 50. Therefore, although the movement of the overrunning clutch 3 in a forward direction (to the right in FIG. 1) is suspended once, the plate 5*a* provided on the inside periphery of the plunger 4 causes the coil spring 6 to bend and the plunger 4 is thereby further attracted to continue the movement. The shift plate 7 also moves in a forward direction and is brought into contact with the plate 9*c*.

Even after this condition, the plunger 4 is successively attracted and hence the plate 9*c* secured to the contact shaft 8 is pushed by the shift plate 7. The contact shaft 8 also moves in the forward direction. When the moving contact 8*e* of the contact shaft 8 is thereby brought into contact with the first and second fill fixed contacts 10*a,* 10*b,* power from a battery is supplied and the armature 12 is thereby caused to rotate.

It is noted that the contact shaft 8 moves until the plunger 4 reaches the condition in which it is fully attracted and its end 4*t* side is brought into contact with the exciting core 2*c.* At this time, the coil spring 9*b* is compressed by the plate 9*a* and the moving contact 8*e* is thereby pushed to keep contact with the first and second fixed contacts 10*a,* 10*b.*

Once the armature 12 starts to rotate, the revolving force is reduced via the reduction mechanism 18, transferred to the output shaft 1, and extended to the overrunning clutch 3 and further to the pinion 3P. Then the pinion 3P rotates slowly. When the crest and bottom of the teeth of the pinion 3P correspond with the bottom and crest of the teeth of the ring gear respectively, the pinion 3P is pushed out in a forward direction by the spring force (elastic force) of the bent coil spring 6 and meshes completely with the ring gear 50. This causes a crank shaft, joined with the ring gear 50, to rotate to start the engine.

When the engine starts, the output shaft 1 is separated from the pinion 3P by the action of the overrunning clutch 3, causing the pinion 3P to run idle. When the energizing of the exciting coil 2*a* is suspended, the plunger 4 and the overrunning clutch 3 return to their original positions by push-back coil springs 9*d*, 9*v* and the pinion 3P is thereby separated from the ring gear 50.

If the crest and bottom of the teeth of the pinion 3P correspond with the bottom and crest of the teeth of the ring gear 50 respectively, these pinion and gear are intermeshed as is without bringing the end face 3P*e* of the pinion 3P into contact with the end face 50*e* of the ring gear 50, posing no problem.

According to the first embodiment, the cylinder body 5 formed of a non-magnetic material or less permeable material is arranged so as to cover the outside periphery of the output shaft 1 which corresponds to the prescribed interval g2, thereby producing a structure which can be small in size and can reduce the magnetic flux which leaks from the plunger 4 to the output shaft 1 making it possible to increase the attractive force.

The cylinder body 5 also functions to transfer the elastic force accumulated in the coil spring 6 to the overrunning clutch 3. Therefore, a starter having the following effects in addition to the above effects can be attained.

Specifically, in the starter of the present invention, the end face 3P*e* of the pinion 3P is brought into contact with the end face 50*e* of the ring gear 50 in advance by the elastic force of the coil spring 6 prior to the rotation of the armature 12. Then the armature 12 is rotated and further the pinion 3P is meshed with the ring gear 50 by the elastic force of the coil spring 6. Hence no opportunity is afforded for occurrence of such a phenomenon whereby the pinion 3P bounces.

Accordingly, no chance is afforded for the occurrence of such a phenomenon whereby the pinion 3P bounces when it is engaged with the ring gear 50 and jumps again into the ring gear 50. Hence the pinion 3P can be smoothly meshed with the ring gear 50, giving high reliability when the pinion 3P is meshed with the ring gear 50. Also, the wear of the gear can be reduced with the result that the life of the gear can be prolonged.

Also, since the range of movement of the contact shaft 8 is made smaller than that of the plunger 4, the contact chamber Z can be small. The starter can be made small accordingly.

In other words, starters conventionally used have a structure in which a contact shaft moves the same distance as a plunger. Such a structure requires a large space between a moving contact and a fixed contact when an armature is rotated after a pinion is brought into contact in advance with a ring gear, as in the first embodiment. Considering the necessity for securing a moving space for a plate (e.g., a snap ring) holding a spring pressing a moving contact, a contact section is necessarily large in the structure of the conventional starter.

In contrast to the above conventional starter, the starter according to the first embodiment ensures that, in addition to the above effects, the range of movement of the contact shaft 8 can be reduced and the contact chamber Z can be small resulting in a small-sized starter.

Second Embodiment

Figure 2:
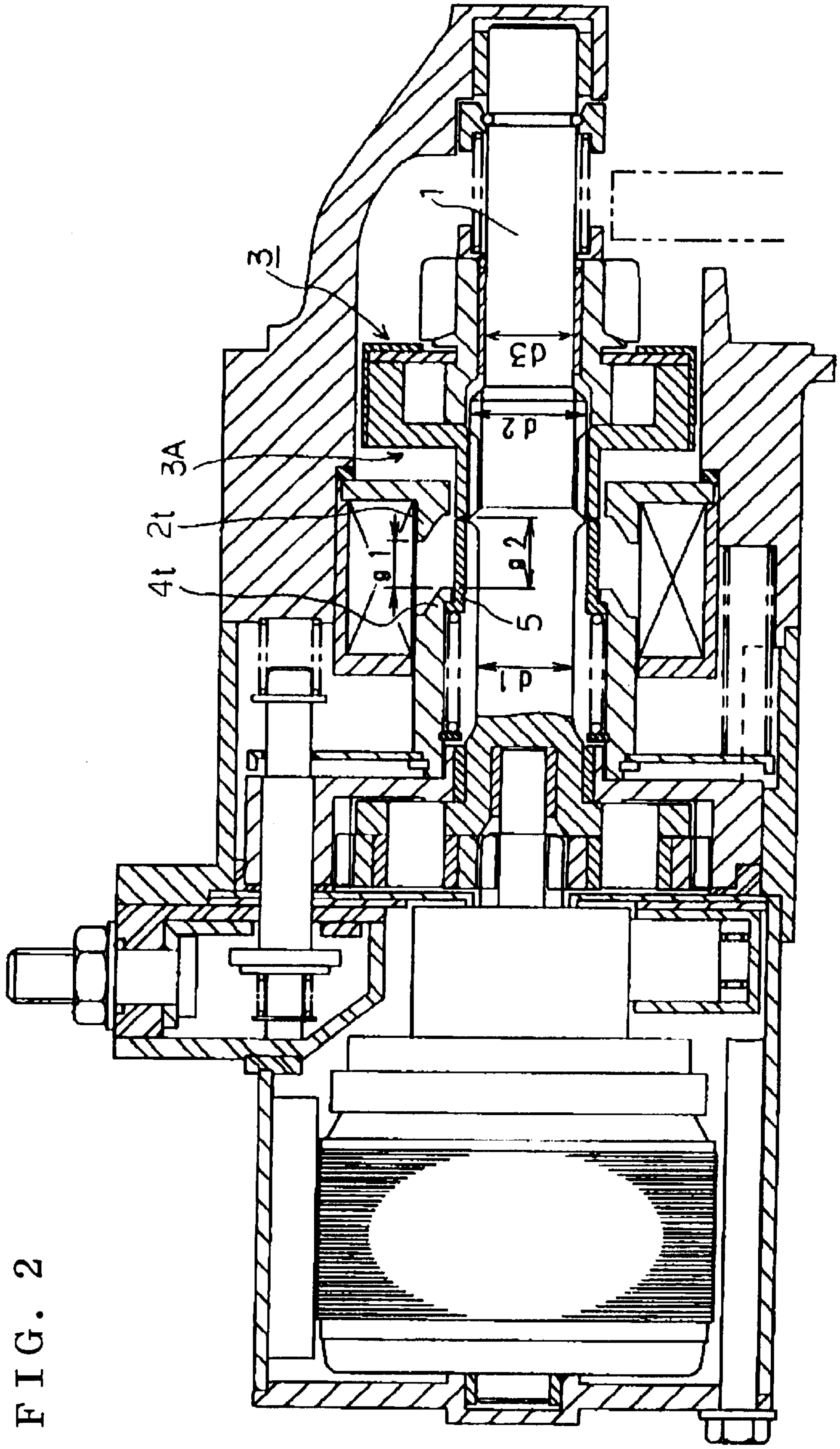
FIG. 2 is a sectional view for explaining a starter according to a second and a third embodiment.

As shown in FIG. 2, the interval between a cyclic projecting section 2*t*, that is the end 2*t* of the core 2*c*, and the end 4*t* of the plunger 4 is designed to be g1 narrower than the aforementioned interval g2 in the condition where the plunger 4 is unexcited by the exciting coil 2*c*. By designing the interval g2>the interval g1, the distance (=interval g2) between the ends of the plunger 4 and the thrust spline 3A is less than the distance (=interval g1) between the ends of the exciting core 2*c* and plunger 4. This results in many magnetic fluxes flowing between the plunger 4 and the exciting core 2*c* whereas magnetic fluxes flow with difficulty between the plunger 4 and the thrust spline 3A, thereby increasing the force attracting the plunger 4.

Figure 3:
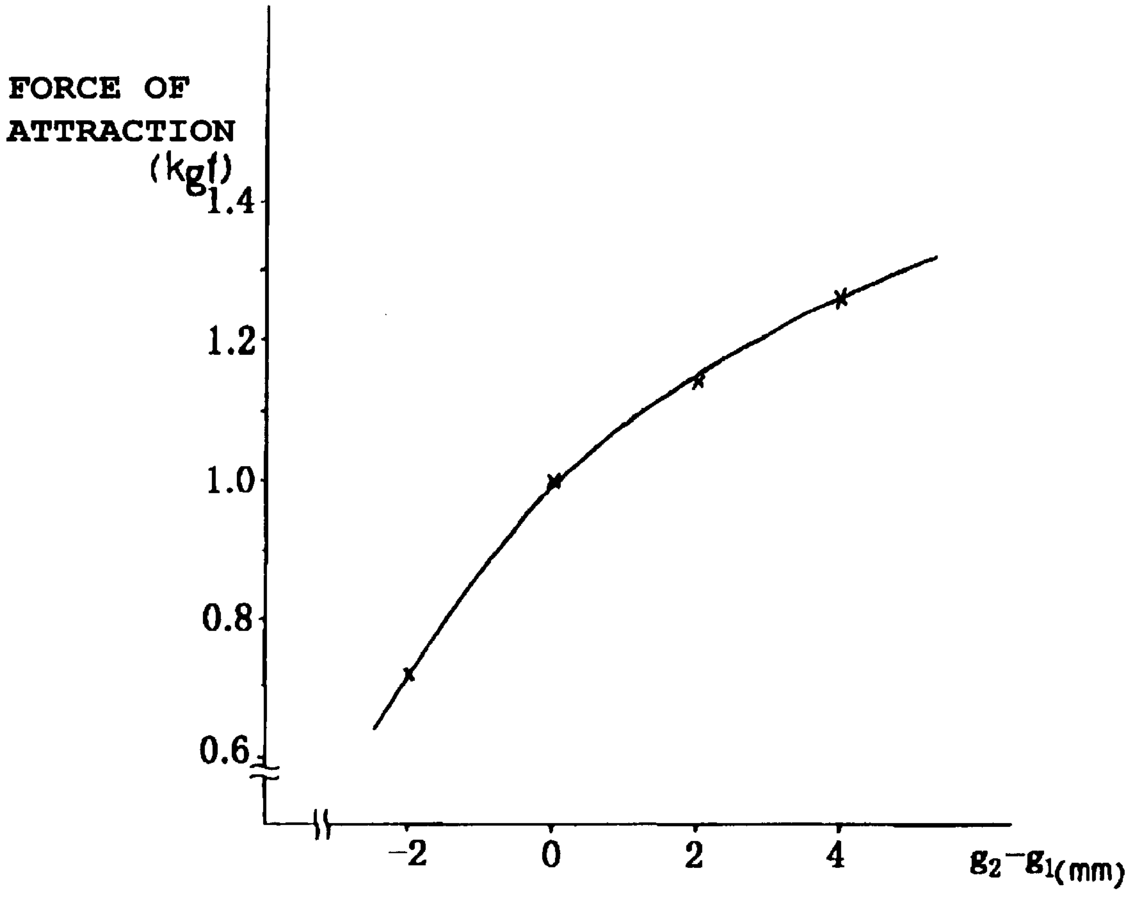
FIG. 3 is a view for explaining the effect of the second embodiment.

FIG. 3 shows the results of an experiment to find the relation between the value (mm) of g2–g1 and attractive force kgf. According to this embodiment, as shown in FIG. 3, the attractive force can be increased by increasing the value of g2–g1.

Therefore, if the first embodiment is combined with the second embodiment, a more efficient starter can be obtained.

Third Embodiment

The diameter d1 of the output shaft at least at the part corresponding to the above prescribed interval g2 is made smaller than the shaft diameter d2 of the part which is spline-joined with the thrust spline 3A.

In this case, if the diameters d2 and d1 are made smaller, the attractive force increases. However, if the shaft diameter d2 is made smaller than the shaft diameter d3 of the part to which the pinion 3P is attached, the pinion 3P cannot be assembled. Therefore the equation d3>d2 must be established.

If hardened steel is used for the output shaft 1, the shaft itself has high strength even if d1 is small. It is therefore possible to greatly increase the attractive force as d1 is made smaller within a limit for withstanding against bending and twisting.

Figure 4:
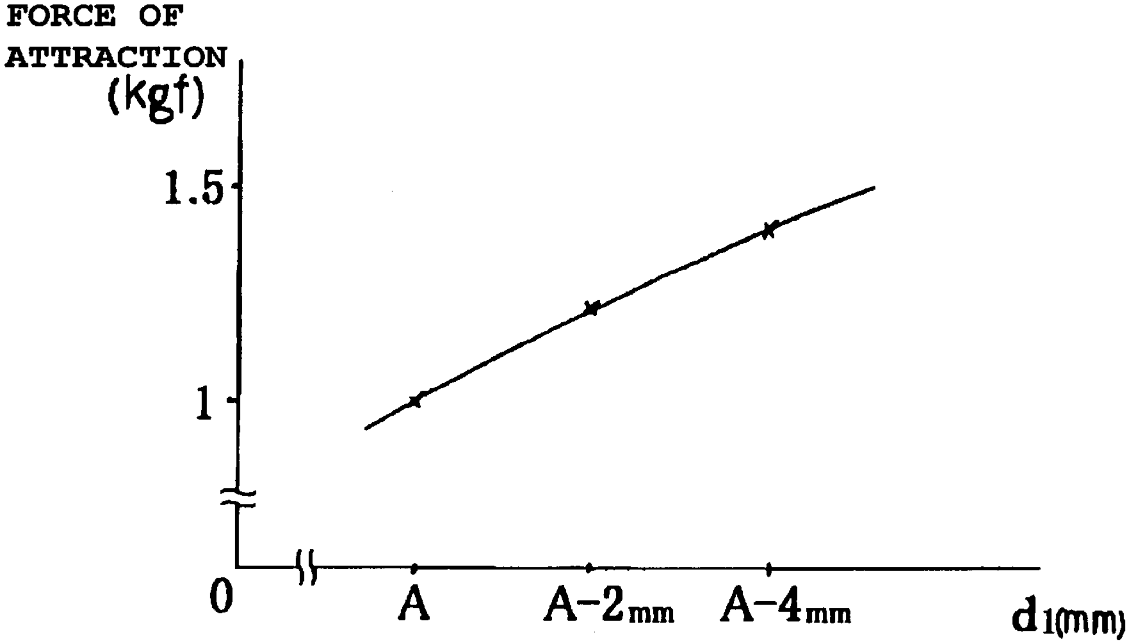
FIG. 4 is a view for explaining the effect of the third embodiment.

FIG. 4 shows the result of an experiment to find the relation between the value of d1=A–n (mm) when d2 is A and the attractive force (kgf). In this embodiment, as is clear from FIG. 4, the smaller d1 is as compared to d2, the more greatly the attractive force can be increased.

Therefore, it is needless to say that a combination of the first embodiment, the second embodiment and the third embodiment enables the production of a more efficient starter.

It is noted that the various aforementioned springs may be rubber or the like and it is essential to use an elastic means which can accumulate elastic force.

Although, in the above explanations, the contact shaft 8 is supported by the support hole 17*b* formed in the internal gear member 17, the structure may be allowed in which a support section is formed with a support hole for supporting the contact shaft 8 in the center bracket 30 as an external wall member to support the contact shaft 8 by the center bracket 30.

As stated above, according to the present invention, an overrunning clutch is arranged in a manner whereby one end of a thrust spline is positioned so as to maintain a prescribed interval from the end of a plunger facing an exciting core, and the outside periphery of an output shaft corresponding to the prescribed interval is covered by a non-magnetic material or less-permeable material, thereby providing a starter which can be small in size and ensures sufficient attractive force against the plunger.

It is possible to further increase the attractive force against the plunger by increasing the interval between the end of the exciting core and the end of the plunger or by making the diameter of the output shaft, at least at the part corresponding to the prescribed interval, smaller than the shaft diameter of the part which is spline-joined with the thrust spline.

Also by providing a contact shaft moving means, in addition to the above effects, a pinion can be smoothly meshed with a ring gear, thereby giving high reliability when the pinion is meshed with the ring gear and reducing the wear of the gear to prolong the life of the gear and a contact chamber can be small thereby providing a small starter, Moreover, by providing a forcing means, the pinion can be smoothly meshed with the ring gear.

What is claimed is:

1. A starter having an output shaft driven by a motor, said starter comprising:

a plunger;

an exciting coil; and an overrunning clutch having a thrust spline which is spline-joined with said output shaft, said plunger, said exciting coil and said overrunning clutch being coaxially disposed with respect to said output shaft, wherein said plunger is attracted in a direction toward an exciting core when said exciting coil is excited, such that said plunger is operative to energize said motor and to move said overrunning clutch so that said thrust spline is moved toward a ring gear to mesh with a pinion disposed on the overrunning clutch, with the ring gear thereby starting an engine, and wherein said overrunning clutch is arranged so that one end of said thrust spline is positioned so as to maintain a prescribed interval from an end of said plunger facing the exciting core in the condition where the plunger is unexcited by the exciting coil and the outside periphery of said output shaft which corresponds to said prescribed interval is covered by a cylinder body formed of a non-magnetic material or less permeable material, and wherein said prescribed interval is made larger than an interval between an end of said exciting core facing said plunger and the end of said plunger facing said exciting core.

2. A starter according to claim 1, wherein the diameter of said output shaft at least at the part corresponding to said prescribed interval is made smaller than the shaft diameter of the part which is spline-joined with said thrust spline.

3. A starter according to claim 1, said starter further comprising:

a contact shaft with one end having a moving contact which is in contact with a fixed contact, the contact shaft being arranged almost parallel to said plunger; and a contact shaft moving means for moving said contact shaft in the direction enabling said moving contact to be in contact with the fixed contact after said plunger is attracted and moved by said exciting coil for a prescribed time, to supply power to the motor.

4. A starter according to claim 1, said starter further comprising a forcing means for causing the pinion to mesh with the ring gear by elastic force when a crest and bottom of teeth of said pinion correspond with a bottom and crest of teeth of said ring gear respectively after an end face of said pinion is brought into contact with an end face of the ring gear.

5. A starter according to claim 1, further including contact shaft moving means which comprises a shift plate secured to said plunger and provided with a through-hole penetrating an end of said contact shaft and a shift plate contact section formed on the other end side of the contact shaft, said shift plate contact section being in contact with the shift plate when the shift plate moves for said prescribed time along with the attraction and shift of said plunger and causing said contact shaft to move by the shift of said shift plate along with subsequent attraction and shift of the plunger to bring said moving contact into contact with a fixed contact.

6. A starter according to claim 1, further comprising:

a first holding section projecting toward the output shaft is provided at the end of said plunger;

said cylinder body formed of a non-magnetic material or less-permeable material is arranged in such a condition that one end thereof is in contact with one end of said thrust spline and the other end is mated with said first holding section through a second holding section; and forcing means comprising an elastic means located in a space between the inside periphery of said plunger and the outside periphery of the output shaft and a pressure plate secured to the inside periphery of said plunger, said pressure plate providing a pressing force on one end side of said elastic means along with the attraction and shift of the plunger and transferring elastic force accumulated in said elastic means to said overrunning clutch through said cylinder body to cause said pinion to mesh with the ring gear.

7. A starter according to claim 1, wherein a contact shaft moving means brings a moving contact of a contact shaft into contact with a fixed contact after an end face of said pinion is in contact with an end face of the ring gear as a result of a forcing means along with the attraction and shift of said plunger for only a prescribed time.

8. In a starter having an output shaft driven by a motor and a plunger, an exciting coil and an overrunning clutch which are set coaxially with respect to the output shaft wherein the plunger is attracted by exciting the exciting coil to drive the motor thereby moving said overrunning clutch having a thrust spline which is spline-joined with the output shaft toward a ring gear to mesh with a pinion disposed on the overrunning clutch, with the ring gear thereby starting an engine, the improvement wherein:

said overrunning clutch is arranged so that one end of said thrust spline is positioned so as to maintain a prescribed interval from the end of said plunger facing the exciting core in the condition where the plunger is unexcited by the exciting coil and the outside periphery of said output shaft which corresponds to said prescribed interval is covered by a cylinder body formed of a non-magnetic material or less permeable material, wherein the diameter of said output shaft at least at the part corresponding to said prescribed interval is made smaller than the shaft diameter of the part which is spline-joined with said thrust spline.

9. In a starter having an output shaft driven by a motor and a plunger, an exciting coil and an overrunning clutch which are set coaxially with respect to the output shaft wherein the plunger is attracted by exciting the exciting coil to drive the motor thereby moving said overrunning clutch having a thrust spline which is spline-joined with the output shaft toward a ring gear to mesh with a pinion disposed on the overrunning clutch, with the ring gear thereby starting an engine, the improvement wherein:

said overrunning clutch is arranged so that one end of said thrust spline is positioned so as to maintain a prescribed interval from the end of said plunger facing the exciting core in the condition where the plunger is unexcited by the exciting coil and the outside periphery of said output shaft which corresponds to said prescribed interval is covered by a cylinder body formed of a non-magnetic material or less permeable material, said starter further comprising a forcing means for causing the pinion to mesh with the ring gear by elastic force when a crest and bottom of the teeth of said pinion correspond with a bottom and crest of teeth of said ring gear respectively after an end face of said pinion is brought into contact with an end face of the ring gear.

10. In a starter having an output shaft driven by a motor and a plunger, an exciting coil and an overrunning clutch which are set coaxially with respect to the output shaft wherein the plunger is attracted by exciting the exciting coil to drive the motor thereby moving said overrunning clutch having a thrust spline which is spline-joined with the output shaft toward a ring gear to mesh with a pinion disposed on the overrunning clutch, with the ring gear thereby starting an engine, the improvement wherein:

said overrunning clutch is arranged so that one end of said thrust spline is positioned so as to maintain a prescribed interval from the end of said plunger facing the exciting core in the condition where the plunger is unexcited by the exciting coil and the outside periphery of said output shaft which corresponds to said prescribed interval is covered by a cylinder body formed of a non-magnetic material or less permeable material; and contact shaft moving means which comprises a shift plate secured to said plunger and provided with a through-hole penetrating an end of said contact shaft and a shift plate contact section formed on the other end side of the contact shaft, said shift plate contact section being in contact with the shift plate when the shift plate moves for said prescribed time along with the attraction and shift of said plunger and causing said contact shaft to move by the shift of said shift plate along with subsequent attraction and shift of the plunger to bring said moving contact into contact with a fixed contact.

11. In a starter having an output shaft driven by a motor and a plunger, an exciting coil and an overrunning clutch which are set coaxially with respect to the output shaft wherein the plunger is attracted by exciting the exciting coil to drive the motor thereby moving said overrunning clutch having a thrust spline which is spline-joined with the output shaft toward a ring gear to mesh with a pinion disposed on the overrunning clutch, with the ring gear thereby starting an engine, the improvement wherein:

said overrunning clutch is arranged so that one end of said thrust spline is positioned so as to maintain a prescribed interval from the end of said plunger facing the exciting core in the condition where the plunger is unexcited by the exciting coil and the outside periphery of said output shaft which corresponds to said prescribed interval is covered by a cylinder body formed of a non-magnetic material or less permeable material;

a first holding section projecting toward the output shaft is provided at the end of said plunger;

said cylinder body formed of a non-magnetic material or less-permeable material is arranged in such a condition that one end thereof is in contact with one end of said thrust spline and the other end is mated with said first holding section through a second holding section; and forcing means comprising an elastic means located in a space between the inside periphery of said plunger and the outside periphery of the output shaft and a pressure plate secured to the inside periphery of said plunger, said pressure plate providing a pressing force on one end side of said elastic means along with the attraction and shift of the plunger and transferring elastic force accumulated in said elastic means to said overrunning clutch through said cylinder body to cause said pinion to mesh with the ring gear.

12. In a starter having an output shaft driven by a motor and a plunger, an exciting coil and an overrunning clutch which are set coaxially with respect to the output shaft wherein the plunger is attracted by exciting the exciting coil to drive the motor thereby moving said overrunning clutch having a thrust spline which is spline-joined with the output shaft toward a ring gear to mesh with a pinion disposed on the overrunning clutch, with the ring gear thereby starting an engine, the improvement wherein:

said overrunning clutch is arranged so that one end of said thrust spline is positioned so as to maintain a prescribed interval from the end of said plunger facing the exciting core in the condition where the plunger is unexcited by the exciting coil and the outside periphery of said output shaft which corresponds to said prescribed interval is covered by a cylinder body formed of a non-magnetic material or less permeable material; and wherein a contact shaft moving means brings a moving contact of a contact shaft into contact with a fixed contact after an end face of said pinion is in contact with an end face of the ring gear as a result of a forcing means along with the attraction and shift of said plunger for only a prescribed time.

* * * * *